United States Patent
Klein et al.

(10) Patent No.: US 10,320,780 B2
(45) Date of Patent: Jun. 11, 2019

(54) SHARED SECRET VOICE AUTHENTICATION

(71) Applicant: Knowles Electronics, LLC, Itasca, IL (US)

(72) Inventors: David Klein, Itasca, IL (US); Sridhar Krishna Nemala, Itasca, IL (US); Carlo Murgia, Itasca, IL (US)

(73) Assignee: Knowles Electronics, LLC, Itasca, IL (US)

( * ) Notice: Subject to any disclaimer, the term of this patent is extended or adjusted under 35 U.S.C. 154(b) by 253 days.

(21) Appl. No.: 15/411,131

(22) Filed: Jan. 20, 2017

(65) Prior Publication Data
US 2017/0214687 A1   Jul. 27, 2017

Related U.S. Application Data

(60) Provisional application No. 62/286,265, filed on Jan. 22, 2016.

(51) Int. Cl.
*H04L 29/06* (2006.01)
*H04W 12/06* (2009.01)
(Continued)

(52) U.S. Cl.
CPC ........ *H04L 63/0861* (2013.01); *G06F 21/316* (2013.01); *G06F 21/32* (2013.01);
(Continued)

(58) Field of Classification Search
CPC . H04L 63/083; H04L 63/0861; G06F 21/316; G06F 21/32; H04W 12/06; G10L 17/24
(Continued)

(56) References Cited

U.S. PATENT DOCUMENTS

| | | | | |
|---|---|---|---|---|
| 5,517,558 A | * | 5/1996 | Schalk | G06F 21/32 379/189 |
| 5,621,857 A | * | 4/1997 | Cole | G10L 15/16 704/231 |

(Continued)

FOREIGN PATENT DOCUMENTS

EP     1 669 836 A1     6/2006

OTHER PUBLICATIONS

U.S. Appl. No. 14/548,207, filed Nov. 19, 2014, Knowles Electronics, LLC.

(Continued)

*Primary Examiner* — Hosuk Song
(74) *Attorney, Agent, or Firm* — Foley & Lardner LLP

(57) ABSTRACT

Systems and methods for voice authentication are provided. An example method starts with dynamically generating authentication information and a prompt associated therefor. The authentication information is generated to emphasize differences between an authorized user and others. The authentication information may be generated based on at least one of a user profile, an acoustic environment in which a mobile device is located, and a history of interactions with the mobile device. The authentication information may be an answer to a question which the authorized user would uniquely be able to provide, or it may be a distinctive password. The prompt, for the authentication information, is provided to a user attempting to use the mobile device. The method proceeds with capturing an acoustic sound of a speech of the user and detecting the authentication information in the speech. Based on the detection, a confidence score is determined. Based on the confidence score and context, the method performs an authentication of the user or providing the confidence score, the context, and a transcription of the speech to a next stage of authentication.

20 Claims, 4 Drawing Sheets

(51) Int. Cl.
*G06F 21/31* (2013.01)
*G06F 21/32* (2013.01)
*G10L 17/24* (2013.01)

(52) U.S. Cl.
CPC ............ *G10L 17/24* (2013.01); *H04L 63/083* (2013.01); *H04W 12/06* (2013.01); *H04L 63/1466* (2013.01)

(58) Field of Classification Search
USPC .......................... 726/2–7; 713/186; 382/115
See application file for complete search history.

(56) References Cited

U.S. PATENT DOCUMENTS

| | | | |
|---|---|---|---|
| 6,490,560 B1* | 12/2002 | Ramaswamy | G10L 17/10 704/231 |
| 6,671,672 B1 | 12/2003 | Heck | |
| 7,400,712 B2* | 7/2008 | August | H04M 3/42153 379/88.01 |
| 8,194,880 B2 | 6/2012 | Avendano | |
| 8,255,223 B2* | 8/2012 | Wang | G06F 21/31 704/246 |
| 8,473,287 B2 | 6/2013 | Every et al. | |
| 8,509,736 B2* | 8/2013 | Hodge | H04M 1/67 455/410 |
| 9,185,487 B2 | 11/2015 | Solbach et al. | |
| 2003/0125944 A1 | 7/2003 | Wohlsen et al. | |
| 2007/0236330 A1 | 10/2007 | Cho et al. | |

OTHER PUBLICATIONS

International Search Report and Written Opinion, PCT/US2017/014284, Knowles Electronics, LLC, 11 pages (dated Apr. 18, 2017).

\* cited by examiner

SHARED SECRET VOICE AUTHENTICATION

CROSS-REFERENCE TO RELATED APPLICATIONS

The present application claims priority to U.S. Prov. Appln. No. 62/286,265 filed Jan. 22, 2016, the contents of which are incorporated by reference herein in their entirety.

BACKGROUND

Voice user interfaces are widespread and used to control various computing devices, such as smartphones, car entertainment systems, TV sets, game consoles, wearables, and so forth. There are devices for which the voice user interface is the most convenient form of user input. In some situations, the voice user interface is the only form of user input. To provide security for a computing device (and user), a secure, imposter-proof voice authentication is needed.

Current authentication methods tend to be inaccurate and susceptible to man-in-the-middle attacks. For example, an imposter could simply record the user's voice and play it back to deceive the voice authentication system (often referred to as "playback spoofing attack"). Existing methods for detecting the playback spoofing attacks are neither reliable nor stable, especially if a spoken password is short or voice authentication is performed in a noisy environment.

SUMMARY

Systems and methods for voice authentication are provided. Example methods facilitate preventing playback spoofing attacks when a recorded user voice is used for authentication by another person. Preventing these playback spoofing attacks is challenging when a short password is used or the authentication is carried out in a noisy environment. According to various embodiments, a method includes dynamically generating a password and prompt that is difficult to guess or predict in advance. The generated password and prompt may be based on current acoustic environment conditions and context. The password and prompt can be generated to emphasize differences between a particular user and other users. In some embodiments, the context includes previous and current user activities, geo-locations, and applications for which authentication is required, for example banking, email, and so forth. The password and prompt may be based on a shared secret between a first device operable to provide the prompt and a second device listening for the password. Some embodiments include multistage authentication, wherein each stage communicates context, transcriptions of utterances of the user, and current confidence scores to a next stage.

DETAILED DESCRIPTION

The technology disclosed herein relates to systems and methods for voice authentication. Various embodiments of the present technology may be practiced with any audio devices operable to at least capture acoustic signals.

The audio devices may include hand-held devices, such as wired and/or wireless remote controls, notebook computers, tablet computers, phablets, smart phones, smart watches, personal digital assistants, media players, mobile telephones, and the like. In certain embodiments, the audio devices include a personal desktop computer, TV sets, car control and audio systems, smart thermostats, light switches, dimmers, and so on.

The audio devices may include: radio frequency (RF) receivers, transmitters, and transceivers; wired and/or wireless telecommunications and/or networking devices; amplifiers; audio and/or video players; encoders; decoders; speakers; inputs; outputs; storage devices; and user input devices. The audio devices also include input devices such as buttons, switches, keys, keyboards, trackballs, sliders, touch screens, one or more microphones, gyroscopes, accelerometers, global positioning system (GPS) receivers, and the like. The audio devices can include outputs, such as LED indicators, video displays, touchscreens, speakers, and the like.

In various embodiments, the audio devices operate in stationary and portable environments. Stationary environments can include residential and commercial buildings or structures, and the like. For example, the stationary embodiments can include living rooms, bedrooms, home theaters, conference rooms, auditoriums, business premises, and the like. Portable environments can include moving vehicles, moving persons, other transportation means, and the like.

Figure 1:
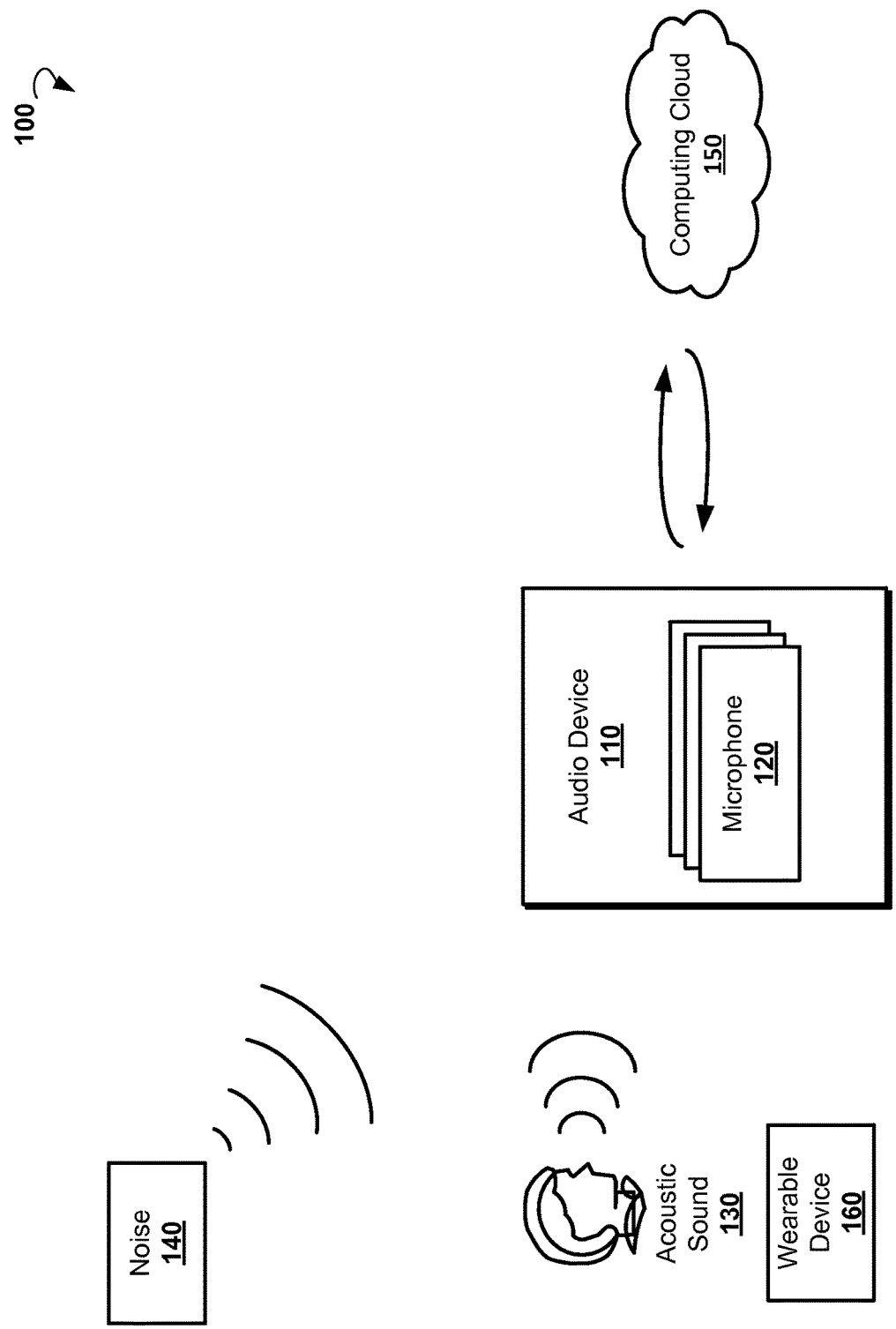
FIG. 1 is a block diagram illustrating an environment in which methods for voice authentication can be practiced, according to various example embodiments.

Referring now to FIG. 1, an example environment 100 is shown in which a method for voice authentication can be practiced. Example environment 100 includes at least an audio device 110 (also referred to as a listening device), which is operable at least to listen for and receive an acoustic audio signal via one or more microphones 120. In some embodiments, the audio device 110 processes the received audio signal. The audio signal captured by the audio device 110 may be provided to a further computing device for processing.

In some embodiments, the audio device 110 is connected to a cloud-based computing resource 150 (also referred to as a computing cloud). The computing cloud 150 may include one or more server farms/clusters comprising a collection of computer servers and is co-located with network switches and/or routers. The computing cloud 150 is operable to deliver one or more services over a network (e.g., the Internet, mobile phone (cell phone) network, and the like). The audio device 110 is operable to send data such as, for example, a recorded audio signal, to a computing cloud, request computing services, and receive back results of the computation.

The acoustic audio signal recorded by the audio device 110 can include at least an acoustic sound 130, for example, speech of a person who operates the audio device 110. In some embodiments, the acoustic sound 130 is contaminated by a noise 140. Noise 140 is unwanted sound present in the environment which may be detected by, for example, sensors such as microphones 120. In stationary environments, noise sources may include street noise, ambient noise, sound from other audio, speech from entities other than an intended speaker(s), and the like. Mobile environments encounter certain kinds of noise which arise from their operation and the environments in which they operate, for example, road, track, tire/wheel, fan, wiper blade, engine, exhaust, entertainment system, communications system, competing speakers, wind, rain, waves, other vehicles, exterior noise, and the like. The noise 140 includes echo and reverberations.

In further embodiments, the environment 100 includes further audio or computing devices. By way of example and not limitation, the user may wear a wearable device 160. In some embodiments, the wearable device 160 is communicatively coupled to the audio device 110 via a wireless interface, such as Bluetooth, WiFi, and the like. The audio device 110 is operable to send at least text messages to be displayed on a screen of the wearable device 160.

Figure 2:
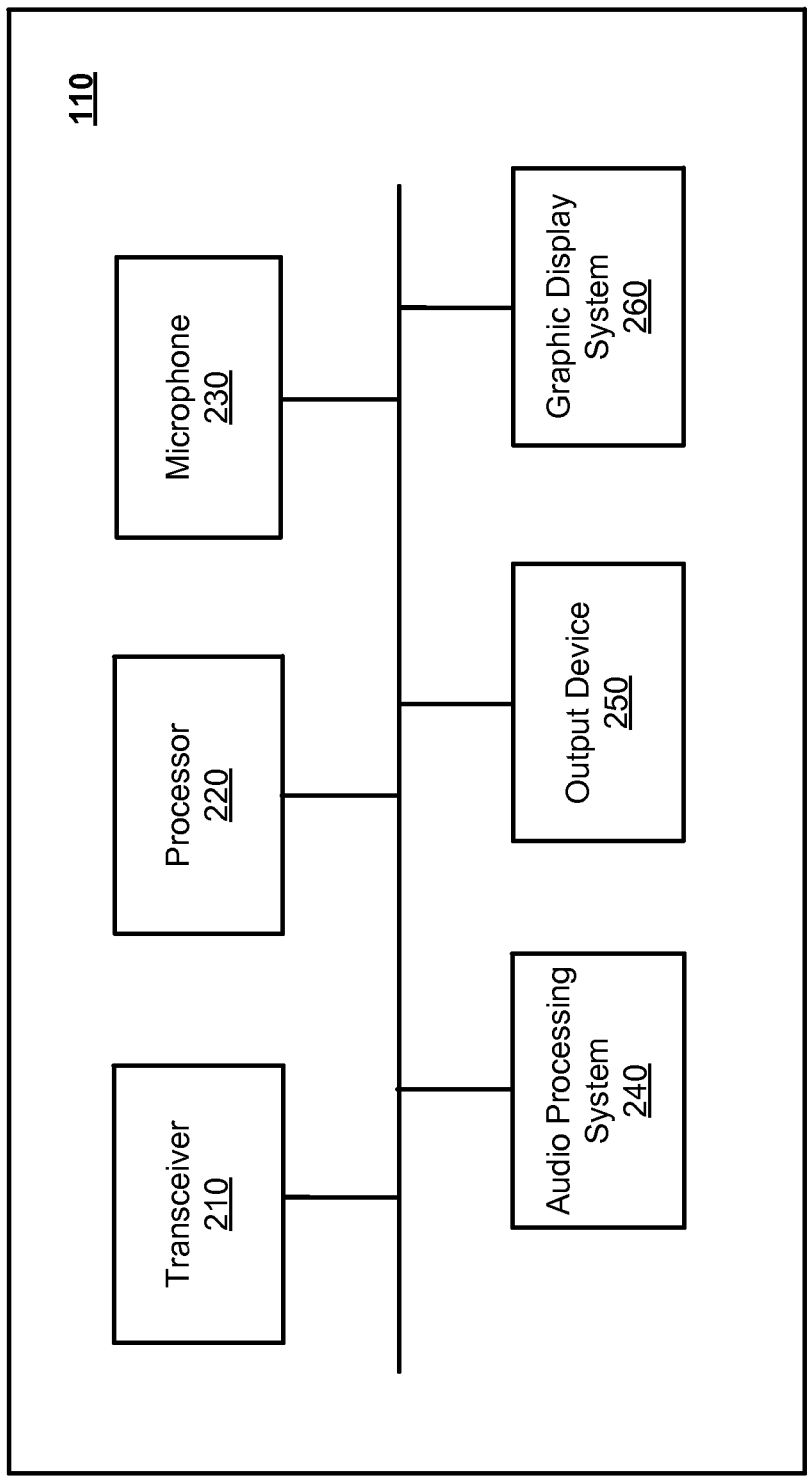
FIG. 2 is a block diagram illustrating an audio device, according to an example embodiment.

FIG. 2 is a block diagram illustrating an example audio device 110 suitable for voice authentication. The example audio device 110 may include a transceiver 210, a processor 220, at least one microphone 230, an audio processing system 240, an output device 250, and a graphic display system 260. In other embodiments, the audio device 110 includes more or other components to provide a particular operation or functionality. Similarly, the audio device 110 may comprise fewer components that perform similar or equivalent functions to those depicted in FIG. 2.

In some embodiments, the transceiver 210 is configured to communicate with a network such as the Internet, Wide Area Network (WAN), Local Area Network (LAN), cellular network, and so forth, to receive and/or transmit audio data stream. The received audio data stream may be then forwarded to the audio processing system 240 and the output device 250.

The processor 220 may include hardware and software that implement the processing of audio data and various other operations depending on a type of the audio device 110 (e.g., a communication device and a computer). A memory (e.g., nontransitory computer readable storage medium) may store, at least in part instructions and data for execution by processor 220.

The audio processing system 240 may include hardware and software that implement encoding of acoustic signal(s). For example, the audio processing system 240 is further configured to receive acoustic signals from an acoustic source via microphone 230 (which may be one or more microphones or acoustic sensors) and process the acoustic signals. After reception by the microphone 230, the acoustic signals can be converted into electric signals by an analog-to-digital converter. In some embodiments, the processing of acoustic signal(s) includes noise suppression and/or noise reduction. An example an audio processing system suitable for performing noise reduction is discussed in more detail in U.S. patent application Ser. No. 12/832,901 (now issued as U.S. Pat. No. 8,473,287), entitled "Method for Jointly Optimizing Noise Reduction and Voice Quality in a Mono or Multi-Microphone System/' filed Jul. 8, 2010, the disclosure of which is incorporated herein by reference for all purposes. By way of example and not limitation, noise reduction methods are described in U.S. patent application Ser. No. 12/215,980 (now issued as U.S. Pat. No. 9,185,487), entitled "System and Method for Providing Noise Suppression Utilizing Null Processing Noise Subtraction" filed Jun. 30, 2008, and in U.S. patent application Ser. No. 11/699,732 (now issued as U.S. Pat. No. 8,194,880), entitled "System and Method for Utilizing Omni-Directional Microphones for Speech Enhancement" filed Jan. 29, 2007, the disclosure of which are incorporated herein by reference in their entireties for all above purposes.

The output device 250 is any device which provides an audio output to a listener (e.g., an acoustic source). For example, the output device 250 may comprise a speaker, a class-D output, an earpiece of a headset, or a handset on the audio device 110.

The graphic display system 260 is operable to provide a user graphic interface including providing at least text messages and images to a user.

In various embodiments, the audio device 110 provides applications for authentication of a user. In other example embodiments, the authentication includes one or more stages.

In some embodiments, an initial stage of authentication is verbal where a user's utterance is either text-independent (e.g., an unknown command that is not included on a known predetermined list of commands) or text-dependent (e.g., a known command from the predetermined list of commands). This initial stage of authentication may be relatively inaccurate and susceptible to playback spoofing. However, this initial stage of authentication provides information that is relevant and useful for n Inter stage(s) of authentication. The information may include:

(1) List of individual(s) or individual type(s) that are candidates for matching. A number of profiles may be stored for individual users. From the list, the method, according to various embodiments, determines a subset of the stored profiles that match the input received during the initial stage of authentication within a predetermined probability and are thus deemed to be candidates for matching;

(2) Confidence score(s) associated with individual(s) or individual type(s). An exemplary method for generating confidence scores is found in U.S. patent application Ser. No. 14/548,207, filed Nov. 19, 2014, entitled "Method for Modeling User Possession of Mobile Device for User Authentication Framework", which is incorporated by reference herein;

(3) The spoken word or phrase that was uttered by the user; and (4) Indication that the context, utterance, and the confidence score(s) necessitate a further authentication stage. For example, a short segment uttered by the user during the initial stage of authentication may be too similar to other known speakers, such that a longer, more discriminating uttered segment would be needed at a later stage.

The initial stage may use context and known or estimated utterances to improve its own confidence or defer further authentication to later stages of authentication to use this information.

In various embodiments, either in a single stage authentication or multi-stage authentication, the stage of authentication can present a dynamically generated password to a user, which the user then utters. The password is presented to the user either through text on a display, or through a text-to-speech interface. In some embodiments, the password is presented by a listening device, or by another device for which the password generation algorithm is provided by the listening device.

In some embodiments, the following criteria and combination thereof are used by a password generator:

(1) The password is computationally prohibitive to predict. For example, the password is generated based on a key (for example, the current time of day and/or other information that is known uniquely by the legitimate user, that is not readily predictable computationally in advance and thus can be considered a "secret"). This key is shared by the password generator and the listening device.

(2) The password is selected in order to emphasize the differences between the claimed identity of the user and other individuals based on knowledge of the user's speech tendencies (for example, distinct characteristics of the user's voice such as an accent, tone, pitch, volume, and typical modulation of intonation or pitch in the user's voice).

(3) The password is selected in order to emphasize the differences between the claimed identity of the user and other individuals based on knowledge of the background noise in the listening environment (for example, does the background noise match noise that was previously stored from the user's home or office, or in the user's vehicle that would add an element of distinctiveness that would be more uniquely associated with the user).

In some embodiments, the method includes combining the criteria (1)-(3), which in turn includes automatically generating a list of passwords (for example, 10 passwords) that are each based on the shared secret key (e.g., the time of day). The system selects a certain password from this list by choosing the password that would provide the biggest differences between the claimed identity of the user and other individuals in the current environment in which the password would be spoken. The selection can be based on the user profile, location of the user and device, history of stored context for the user including locations, history of the user's interactions with the device, to name a few, to distinguish between the user and other individuals.

Using the known password, the listening device can produce a detection of the password and simultaneous authentication of the user with an associated confidence score. As with possible preceding stages, the current stage of authentication can trigger latter stages of authentication if the context and confidence so necessitates.

In some embodiments, the password detection and authentication occurs when the mobile device is in a mode in which it is continually listening for any sounds irrespective of prior or currently detected voice activity. In other embodiments, the password detection and authentication is triggered by earlier processing stages such as voice-activity detection.

The context may include a transcription of previous utterances and security requirements of the application for which the authentication is required. In some embodiments, the context includes information regarding the identity of an authentic, authorized user provided by other sensors or detected activities, and the like. For example, utilizing a camera for face detection processing, using changes in the data from inertial sensors (e.g., vibrations detected from the user's fingers that are unique to the user), proximity sensors, and/or temperature sensors. An exemplary method using various sensors to determine context is found in U.S. patent application Ser. No. 14/548,207, filed Nov. 19, 2014, entitled "Method for Modeling User Possession of Mobile Device for User Authentication Framework", which is incorporated by reference herein.

Figure 3:
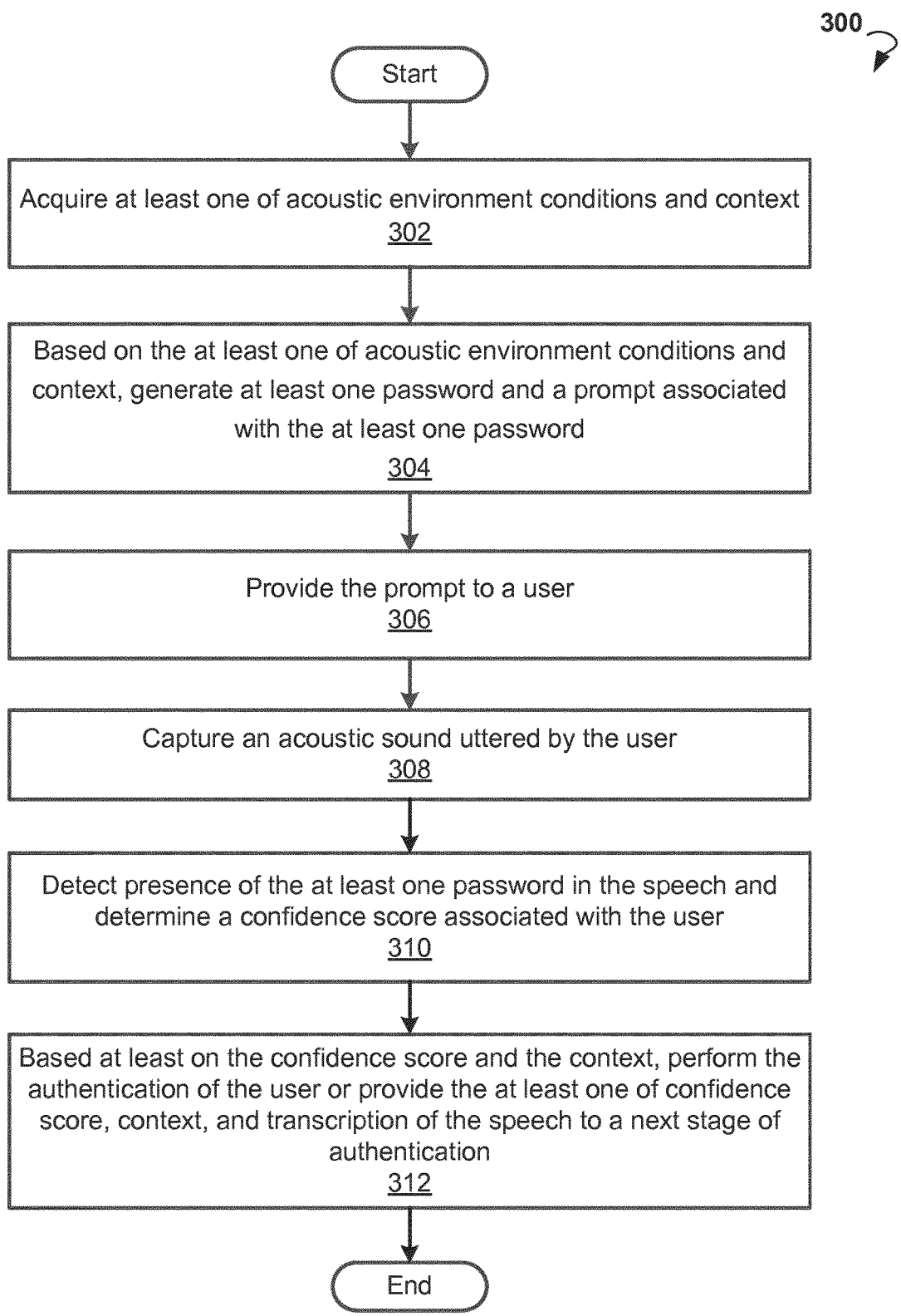
FIG. 3 is a flow chart showing a method for voice authentication, according to an example embodiment.

FIG. 3 is a flow chart showing steps of a method 300 for voice authentication, according to an example embodiment. For example, the method 300 can be implemented in environment 100 using an audio device 110 and, optionally, the wearable device 160. In certain embodiments, the method 300 presents a stage in a multiple stage authentication process in which each stage communicates data to a successive stage. The communicated data includes a context a transcription of spoken words, a confidence score, and the like. Some stages provide a user specific word to pronounce, while other stages do not provide a specific word.

In some embodiments, the method 300 commences in block 302 with acquiring at least one of acoustic environment conditions and context. The acoustic environment conditions include noise as well as a type and a level of the noise. The context may be associated with an application that requires the authentication, for example, banking, email, and so on. In other embodiments, the context includes a specific place where a user is currently located (e.g., an office, a street, a store, and a car). The context can include user activities at the moment (e.g., walking, driving a car, and so on) or previous user activities. In some embodiments, the context can also include utterances made by the user previously that were stored in the mobile device or an accessible computing cloud.

In block 304, the method 300 proceeds with generating, based on the at least one of acoustic environment conditions and context, at least one password and a prompt (which may be associated with the authentication information such as a password or other information used to authenticate). In some embodiments, the authentication information is unknown to the user beforehand. The prompt may include a request to speak the authentication information, e.g., a password or an answer to a question regarding information which the actual user would uniquely be able to answer.

In other embodiments, the prompt includes a specific shared secret. For example, a secret can be shared by an audio device 110 (listening device) and a device configured to provide the prompt. For example, the secret can be shared between a smart phone and a wearable device. The example prompt can include "What is the word displayed on your smartwatch?"

The password may be selected based on knowledge of the speech of the authentic, authorized user or a user type in order to improve the authentication accuracy. For example, words that the user has pronounced in the past with some distinctive accent, and tone, pitch or other vocal characteristics that are indicative of the user. In certain embodiments, the password is selected based on knowledge of the acoustic environment (e.g., in a car, road noise, street noise) to select a password in order to improve authentication accuracy for a specific user. In a car, for example, the prompt may include "What highway are you driving on now?" and the generated password can be the number of the highway (e.g., the "101" freeway).

In block 306, the prompt is provided to the user—the user being an individual attempting to use and/or access the mobile device. In some embodiments, the prompt is provided using a text display of a smart phone, a wearable, a tablet computer, and the like. In other embodiments, the prompt is provided via loudspeakers or a headset of an audio device, using, for example, a text-to-speech synthesis system. As described above, the prompt is for prompting the user to provide authentication information, which may include asking the user to provide an answer to a question (e.g., What highway are you driving on now?") or asking the user to speak a password. The prompt can be of two types—(i) the user is asked to just repeat a keyword/phrase; or (ii) the user is asked to answer a question about certain information to which only a target user might be privy. For the latter type, not only would the user's response be verified in regard to providing a correct answer to the question, but the method would also perform verification of the user's voice, according to various embodiments. In other embodiments, the method determines which prompt to use variously based on a user profile, based on the acoustic environment, based on the result from prior authentication stages when multistage authentication is used, and/or based on other contexts (which may be previous and current user activities, geolocations, and use of applications on the mobile device for which authentication is more critical, e.g., banking, email and so forth).

In block 308, the example method 300 proceeds with capturing an acoustic sound. The acoustic sound includes a speech of the user.

In block 310, the example method 300 allows detecting the password in the speech. In block 310, the speech may be analyzed for presence of the password in the speech. The example method 300 may proceed with determining a confidence score associated with authentication of the user.

In various embodiments, contexts are used to assist a voice authentication decision. The contexts include a current application (e.g., banking, email), previous user activity (e.g., geographical location), previous user utterances, and so forth.

In block 312, the example method 300, based on the confidence score and the context, performs the authentication of the user or provides the confidence score, context, or transcription of the speech to a next stage of authentication.

Figure 4:
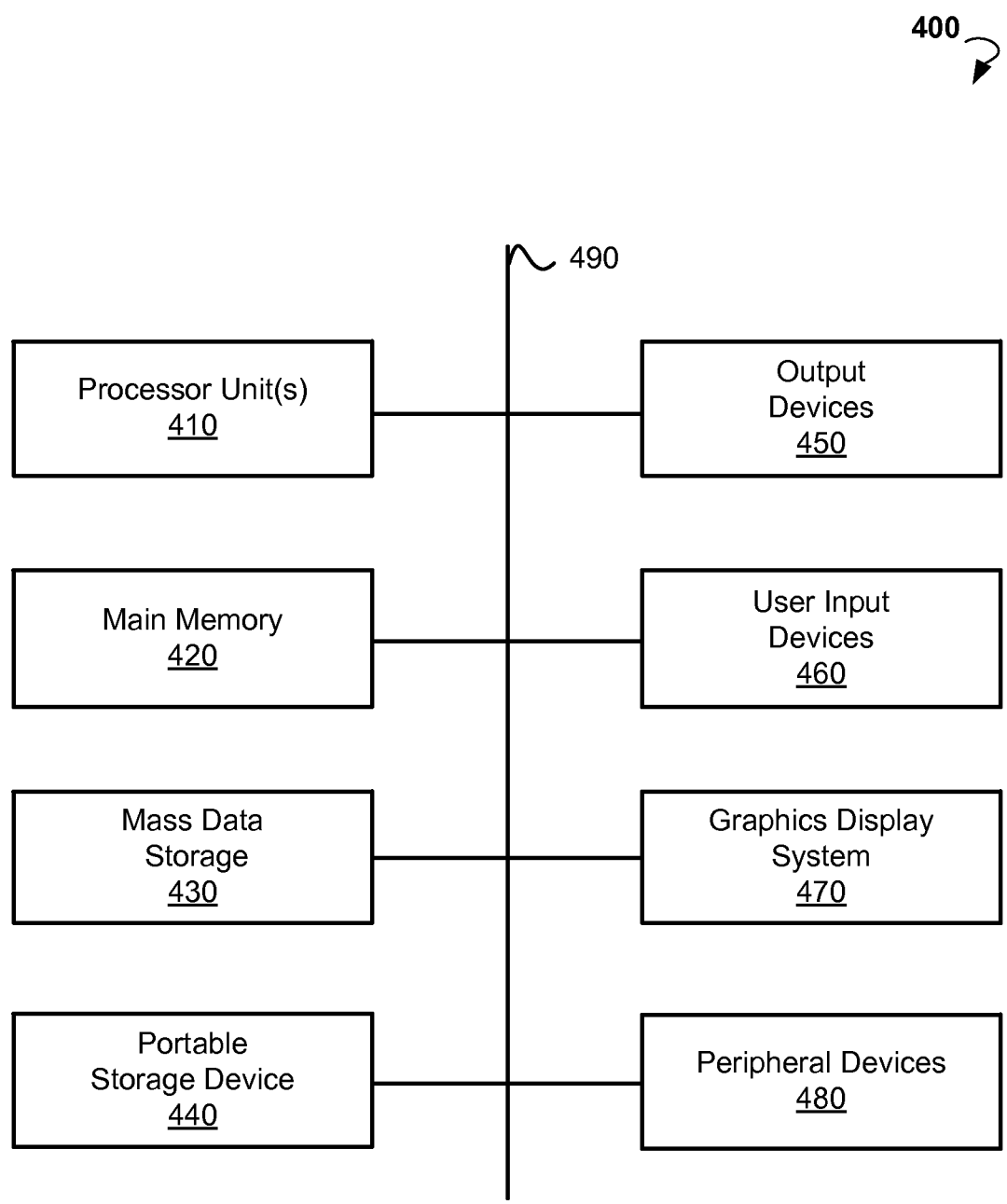
FIG. 4 illustrates an example computer system that may be used to implement embodiments of the disclosed technology.

FIG. 4 illustrates an exemplary computer system 400 that may be used to implement some embodiments of the present invention. The computer system 400 of FIG. 4 may be implemented in the contexts of the likes of computing systems, networks, servers, or combinations thereof. The computer system 400 of FIG. 4 includes one or more processor units 410 and main memory 420. Main memory 420 stores, in part, instructions and data for execution by processor units 410. Main memory 420 stores the executable code when in operation, in this example. The computer system 400 of FIG. 4 further includes a mass data storage 430, portable storage device 440, output devices 450, user input devices 460, a graphics display system 470, and peripheral devices 480.

The components shown in FIG. 4 are depicted as being connected via a single bus 490. The components may be connected through one or more data transport means. Processor unit 410 and main memory 420 is connected via a local microprocessor bus, and the mass data storage 430, peripheral device(s) 480, portable storage device 440, and graphics display system 470 are connected via one or more input/output (I/O) buses.

Mass data storage 430, which can be implemented with a magnetic disk drive, solid state drive, or an optical disk drive, is a non-volatile storage device for storing data and instructions for use by processor unit 410. Mass data storage 430 stores the system software for implementing embodiments of the present disclosure for purposes of loading that software into main memory 420.

Portable storage device 440 operates in conjunction with a portable non-volatile storage medium, such as a flash drive, floppy disk, compact disk, digital video disc, or Universal Serial Bus (USB) storage device, to input and output data and code to and from the computer system 400 of FIG. 4. The system software for implementing embodiments of the present disclosure is stored on such a portable medium and input to the computer system 400 via the portable storage device 440.

User input devices 460 can provide a portion of a user interface. User input devices 460 may include one or more microphones, an alphanumeric keypad, such as a keyboard, for inputting alphanumeric and other information, or n pointing device, such as a mouse, a trackball stylus, or cursor direction keys. User input devices 460 can also include a touchscreen. Additionally, the computer system 400 as shown in FIG. 4 includes output devices 450. Suitable output devices 450 include speakers, printers, network interfaces, and monitors.

Graphics display system 470 include a liquid crystal display (LCD) or other suitable display device. Graphics display system 470 is configurable to receive textual and graphical information and processes the information for output to the display device.

Peripheral devices 480 may include any type of computer support device to add additional functionality to the computer system.

The components provided in the computer system 400 of FIG. 4 are those typically found in computer systems that may be suitable for use with embodiments of the present disclosure and are intended to represent a broad category of such computer components that are well known in the art. Thus, the computer system 400 of FIG. 4 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, TIZEN, and other suitable operating systems.

The processing for various embodiments may be implemented in software that is cloud-based. In some embodiments, the computer system 400 is implemented as a cloud-based computing environment, such as a virtual machine operating within a computing cloud. In other embodiments, the computer system 400 may itself include a cloud-based computing environment, where the functionalities of the computer system 400 are executed in a distributed fashion. Thus, the computer system 400, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 400, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

The present technology is described above with reference to example embodiments. Therefore, other variations upon the example embodiments are intended to be covered by the present disclosure.

What is claimed is:

1. A method for voice authentication for a user of a device, comprising:
   acquiring information including at least one of information about an authorized user, information about an environment in which the device is located and information about prior interactions with the device by the authorized user;
   based on the acquired information, generating an authentication utterance and a prompt therefor;

providing the prompt to the user, the user being a person attempting to use the device;
capturing an acoustic sound including a speech of the user;
detecting the authentication utterance in the speech; and
based on the detection, determining a confidence score which indicates a probability that the user is the authorized user,
wherein the information is used to generate the authentication utterance that, when spoken by the user, highlights a distinctiveness of the authorized user's voice with respect to the voices of other users.

2. The method of claim 1, further comprising:
based at least on the confidence score, performing authentication of the user.

3. The method of claim 2, wherein the performed authentication is further based on the acquired information.

4. The method of claim 1, further comprising:
based at least on the confidence score, determining whether further authentication processing is required.

5. The method of claim 4, further comprising:
providing one or both of the acquired information and a copy of the captured sound to the further authentication processing along with the confidence score.

6. A method for voice authentication for a user of a device, comprising:
acquiring information including at least one of information about an authorized user, information about an environment in which the device is located and information about prior interactions with the device by the authorized user;
based on the acquired information, generating an authentication utterance and a prompt therefor;
providing the prompt to the user, the user being a person attempting to use the device;
capturing an acoustic sound including a speech of the user;
detecting the authentication utterance in the speech; and
based on the detection, determining a confidence score which indicates a probability that the user is the authorized user,
wherein the information is used to generate the authentication utterance that, when spoken by the user, highlights a distinctiveness of the authorized user's voice with respect to the voices of other users,
wherein generating the authentication utterance includes determining a secret that the authorized user would uniquely be able to provide, wherein the authentication utterance includes the secret.

7. The method of claim 6, wherein the prompt is a question for which the answer is the authentication utterance.

8. The method of claim 1, wherein the authentication utterance comprises a password, wherein the prompt includes asking the user to speak the password.

9. The method of claim 1, wherein the information about the environment in which the device is located includes one or more of the current location, background noise in the environment, information from inertial sensors in the device, information from proximity sensors in the device, information from temperature sensors in the device, and information about a current activity associated with the user of the device.

10. The method of claim 1, wherein the information about prior interactions with the device by the authorized user includes prior utterances of the user.

11. The method of claim 1, wherein the information about prior interactions with the device by the authorized user includes prior actions of the user associated with prior authentications of the user.

12. The method of claim 1, wherein the information further includes information about an application for which authentication is required, wherein the application includes one or more of a banking application and an email application.

13. The method of claim 1, wherein the method for voice authentication is performed in response to a detection of voice activity by the user.

14. An apparatus for performing voice authentication for a user of a device, the apparatus having a processor adapted to:
acquire information including at least one of information about an authorized user, information about an environment in which the device is located and information about prior interactions with the device by the authorized user;
based on the acquired information, generate an authentication utterance and a prompt therefor;
cause the prompt to be provided to the user, the user being a person attempting to use the device;
receive an acoustic sound including a speech of the user;
detect the authentication utterance in the speech; and
based on the detection, determine a confidence score which indicates a probability that the user is the authorized user,
wherein the information is used to generate the authentication utterance that, when spoken by the user, highlights a distinctiveness of the authorized user's voice with respect to the voices of other users.

15. The apparatus according to claim 14, wherein the device is a mobile device.

16. The apparatus according to claim 14, wherein the processor causes the prompt to be provided to the user by being displayed on a display of the device.

17. The apparatus according to claim 14, wherein the processor causes the prompt to be provided to the user by being communicated via a speaker of the device.

18. The apparatus according to claim 14, wherein the processor causes the prompt to be provided to the user by being displayed on a display of another device separate from the device.

19. The apparatus according to claim 14, wherein generating the authentication utterance includes determining a secret that the authorized user would uniquely be able to provide, wherein the authentication utterance includes the secret.

20. The apparatus according to claim 14, wherein the authentication utterance comprises a password, wherein the prompt includes asking the user to speak the password.

* * * * *